United States Patent [19]
White

[11] 3,936,382
[45] Feb. 3, 1976

[54] FLUID EDUCTOR

[75] Inventor: Leslie E. White, Folsom, Calif.

[73] Assignee: Aerojet-General Corporation, El Monte, Calif.

[22] Filed: May 19, 1975

[21] Appl. No.: 578,929

Related U.S. Application Data

[63] Continuation-in-part of Ser. No. 417,856, Nov. 21, 1973, abandoned.

[52] U.S. Cl. ............ 210/198 R; 259/4 AB; 261/76; 261/DIG. 75
[51] Int. Cl.² ............................................ C02B 1/20
[58] Field of Search ................ 210/198 R, 199, 192; 259/4; 261/76, 78 A, DIG. 54, DIG. 75

[56] References Cited
UNITED STATES PATENTS

| | | | |
|---|---|---|---|
| 2,797,904 | 7/1957 | Voorheis | 261/78 A X |
| 3,232,590 | 1/1966 | Eckert | 259/4 X |
| 3,524,630 | 8/1970 | Marion | 261/76 |
| 3,582,050 | 6/1971 | Kozak | 261/DIG. 54 |
| 3,707,067 | 12/1972 | Dietrick | 261/76 X |
| 3,734,111 | 5/1973 | McClintock | 261/DIG. 75 |

FOREIGN PATENTS OR APPLICATIONS

| | | | |
|---|---|---|---|
| 1,036,214 | 8/1958 | Germany | 261/76 |

*Primary Examiner*—Charles N. Hart
*Assistant Examiner*—Robert H. Spitzer
*Attorney, Agent, or Firm*—Warren P. Kujawa

[57] ABSTRACT

A fluid eductor for injecting a secondary fluid e.g. air, oxygen, ozone or other reactant fluids into a primary fluid, e.g. oxygen, waste water, depleted water, sewage fluids or other reactant fluids flowing in a conduit. A spool housing having a generally cylindrical header assembly interior thereof is mounted in the conduit in the flow path of the primary fluid. In a first embodiment, the header assembly comprises a hollow tank, an inlet pipe coupled to an external supply of secondary fluid, a plurality of flow through pipes extending through the header tank along the secondary fluid flow path and terminating downstream of the tank, and a corresponding plurality of conical platelet assemblies each arranged concentrically of the associated flow through pipe. Each conical platelet assembly provides a plurality of flow passages in communication with the interior of the tank and the associated flow through pipe to permit secondary fluid to be injected into the primary fluid flowing through the pipe.

In a second embodiment, the header assembly comprises a hollow tank with an apertured downstream wall, an inlet pipe coupled to an external supply of secondary fluid, a plurality of flow through pipes each extending through the tank and having an outlet adjacent the apertured downstream wall, and a corresponding plurality of conical platelet assemblies each having a hollow interior defining a mixture region with a primary fluid inlet adjacent the associated flow through pipe outlet. Each conical platelet assembly comprises a plurality of concentrically arranged frusto-conical plates each having a base end and an apex end and channels formed on the inner or outer surface, or both, extending from the base to the apex ends, adjacent ones of the plates being arranged in surface contact to seal the channels and form a plurality of fluid passageways in communication with the interior of the tank via the apertured wall and in communication with the mixture region for enabling secondary fluid to flow from the tank to the mixture region and intermingle with primary fluid.

18 Claims, 8 Drawing Figures

3,936,382

FLUID EDUCTOR

CROSS-REFERENCE TO PARENT CASE

This application is a continuation-in-part of U.S. Patent application Ser. No. 417,856 filed 11-21-73 for "FLUID EDUCTOR", now abandoned.

BACKGROUND OF THE INVENTION

This invention relates to fluid eductor devices for injecting a secondary fluid into a flowing primary fluid. More particularly, this invention relates to fluid eductor devices for injecting a gas such as air, oxygen, ozone or other reactant fluids into a liquid such as water, sewage or other reactant fluids flowing along a conduit.

Devices are known for injecting a secondary fluid, such as a gas, into a primary fluid, such as a liquid, flowing within a conduit. While such devices have found wide use in many applications, perhaps the most common application is the problem of oxygen depleted water. Discharge water from many different types of plant installations, such as chemical, petroleum, paper/pulp and pharmaceutical plants, as well as food process facilities and sewage treatment facilities, is frequently deficient in the concentration of oxygen dissolved therein. This oxygen deficiency imposes a severe oxygen demand on receiving waters or in subsequent treatment facilities.

In order to remedy this deficiency, the discharge waters are typically oxygenated in the feed streams by the injection of oxygen or air in order to improve the quality of the discharge water for subsequent use. Examples of devices used for this purpose in the past are diffused aerator units, swing diffusers, surface aerator installations, turbine aerators and spargers. While generally effective in oxygenating the discharge waters, such known units are expensive to install, operate and maintain, and also impose a power demand which must be met by the consumption of increased power by the associated facility. This increase in power consumption raises the overall cost of the operation and is accordingly undesirable. To date, efforts to devise fluid injection systems which are economical and uncomplicated have not met with wide success.

SUMMARY OF THE INVENTION

This invention comprises an economical and simplified device for the injection of a secondary fluid such as a gas into a primary fluid which is deficient in this secondary fluid, and which imposes a low power demand on the associated operating facility. In a first embodiment, the primary fluid is conducted through a spool-mounted header assembly which injects optimum quantities of the secondary fluid into the primary fluid. The header assembly comprises a cylindrical tank having a plurality of flow through pipes passing therethrough. Each flow-through pipe is surrounded by a conical platelet assembly having a plurality of enclosed fluid flow passages in communication with the interior of the header tank through a plurality of concentrically arranged rows of openings in a header tank wall and in communication with the interior of the associated pipe through a plurality of openings arranged circumferentially of the pipe. As primary fluid is conducted along the flow-through pipe, the secondary fluid flows from the header tank through the platelet passages into the interior of the pipe where it mixes with the primary fluid.

In an alternate embodiment, the header assembly flow through pipes terminate at the downstream wall, and each outlet opening defined thereby at the downstream wall is surrounded by a modified integral conical platelet assembly having a hollow interior defining a mixture region with a primary fluid inlet adjacent the associated flow-through pipe outlet. Each platelet assembly comprises a plurality of stacked frusto-conical plates each having a base end and an apex end and a plurality of channels formed in a surface thereof extending between the base end and the apex end and along a line defined by a plane passing through the surface and the geometrical axis of the plate. In the assembly, adjacent ones of the plates are arranged in surface contact so that the channels define enclosed fluid flow passages in communication with the interior of the header tank through one or more openings in the downstream header tank wall and in communication with the mixing region of the platelet assembly. Operation of the alternate embodiment is similar to that of the first embodiment.

In the alternate embodiment, the diameter of the fluid flow passages is preferably increased with increasing length thereof so that the pressure drop experienced by the secondary fluid in flowing from the header tank to the mixture region is substantially uniform over each passage, thereby providing thorough mixing of the primary and secondary fluids.

For a fuller understanding of the nature and advantages of the invention, reference should be had to the ensuing detailed description taken in conjunction with the accompanying drawings.

DESCRIPTION OF THE PREFERRED EMBODIMENTS

Figure 1:
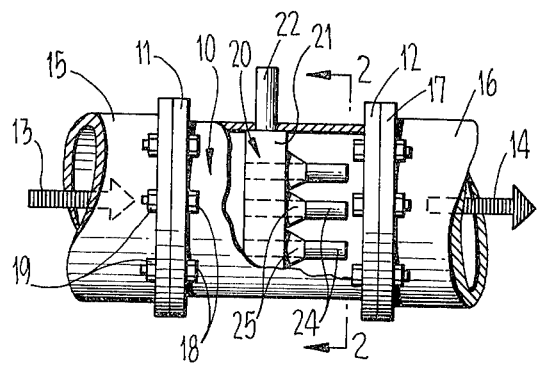
FIG. 1 is a side elevational view, partially broken way, showing the preferred embodiment.

Turning now to the drawings, FIG. 1 illustrates a side elevational view, partially broken away, of a preferred embodiment of the invention adapted for use as a water aerator. A spool shaped housing 10 having a pair of end flanges 11, 12 is mounted in the flow path indicated by flow arrows 13, 14 of oxygen depleted water. Spool housing 10 is coupled at the upstream end to a water inlet conduit 15 provided with a flanged end portion conformable with flange 11. Spool housing 10 is coupled at the downstream end to a water outlet conduit 16 having a flanged end portion 17 conformable to flange 12. Spool housing 10 and conduit sections 15, 16 may be secured by any convenient means, such as bolts 18 and nuts 19.

Mounted in the interior volume of spool housing 10 is a header assembly generally indicated by reference numeral 20 and including a generally cylindrical hollow tank 21. A fluid inlet pipe 22, in communication with the hollow interior of header tank 21 is coupled to a suitable source of air or oxygen (not shown). A plurality of flow-through tubes 24 extend along the interior of header assembly 20 and terminate downstream thereof.

Figure 2:
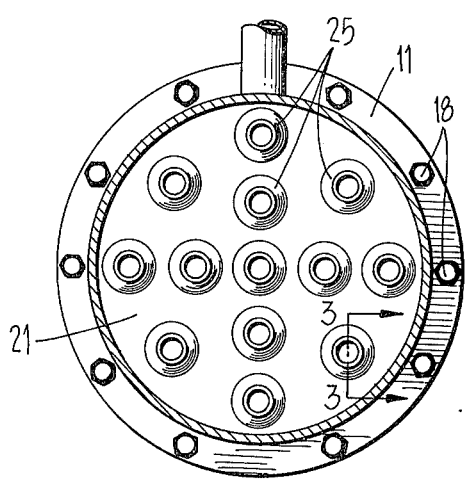
FIG. 2 is a front elevation view taken along lines II—II of FIG. 1.
Figure 3:
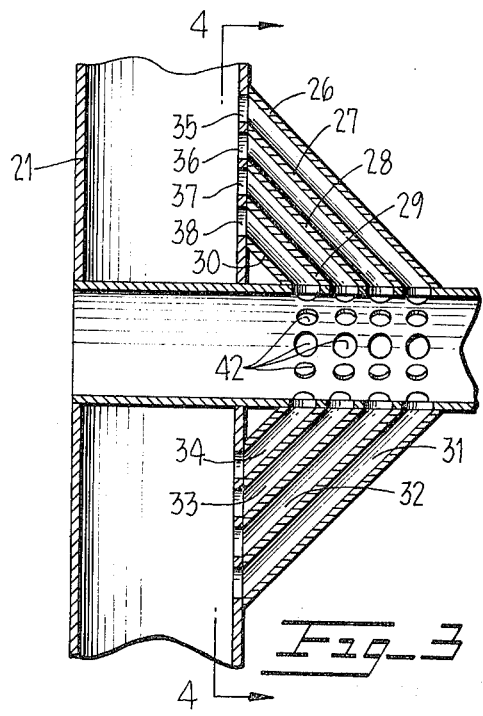
FIG. 3 is a sectional view of a single platelet assembly taken along lines III—III of FIG. 1.

Mounted on the downstream or outlet side of header assembly 20 are a plurality of platelet assemblies 25 arranged in a predetermined spatial pattern as shown in FIG. 2. Platelet assemblies 25 are all of the similar construction illustrated in section in FIG. 3. A plurality of conical plates 26–30 are concentrically arranged about flow-through tube 24 to form a plurality of fluid passages 31–34. Fluid passages 31–34 communicate with the interior of header tank 21 via a plurality of openings 35–38 in the downstream wall 40 of header tank 21. Fluid passages 31–34 are also in fluid communication with the interior of flow-through tube 24 via a plurality of circumferentially arranged apertures 42 in the wall of tube 24.

Figure 4:
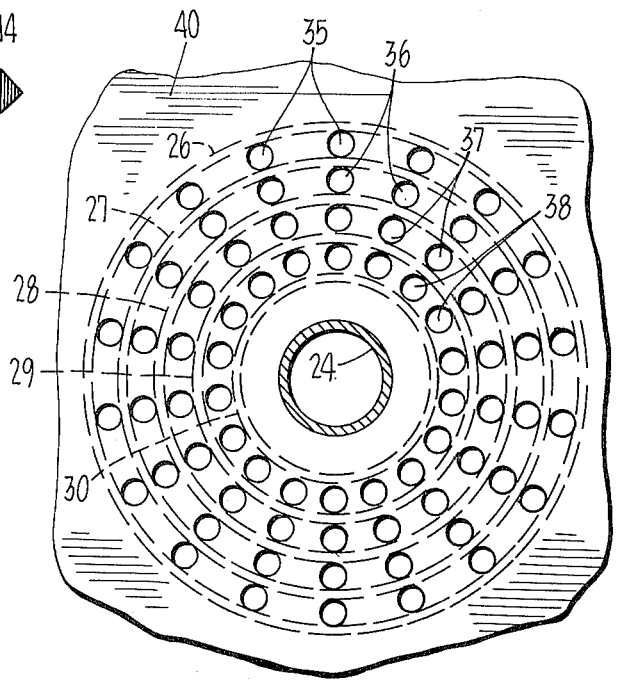
FIG. 4 is a partial view taken along lines IV—IV of FIG. 3.

FIG. 4 illustrates a first arrangement of openings 35–38 in downstream header tank wall 40. As shown in this FIG., openings 35–38 are arranged in a plurality of circular rows concentric to the center of tube 24 and plates 26–30.

Figure 5:
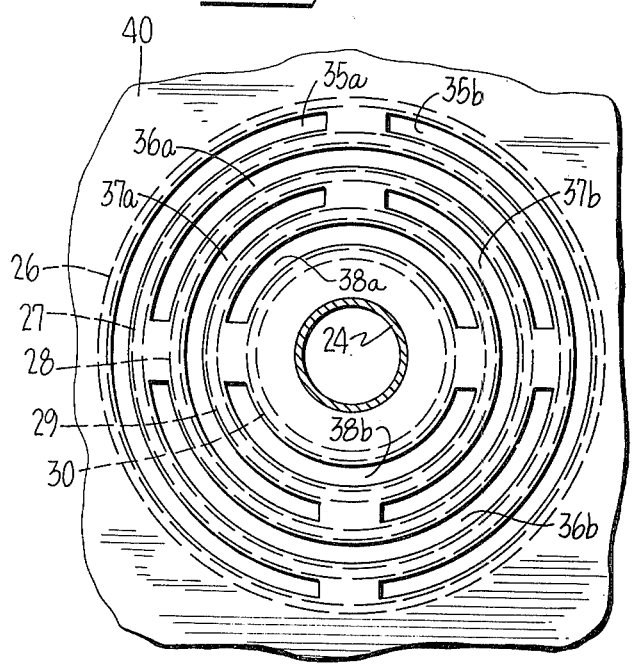
FIG. 5 is a partial view taken along lines IV—IV of FIG. 3 illustrating an alternate construction of the header tank wall.

FIG. 5 shows an alternate arrangement in which openings 35–38 comprise a plurality of pairs of circular segmental apertures 35a,b, . . . , 38a,b, arranged concentrically of tube 24 and plates 26–30 and alternately arranged as depicted.

The physical dimensions of openings 35–38 in either embodiment, as well as the dimensions of apertures 42 in flow-through tube 24 and the spacing between plates 26–30, are dependent upon the desired flow parameters of a given system and may best be determined for any particular application in an empirical manner. For example, when used as a water aerator for oxygen-depleted water, the inter-plate spacing and dimensions of openings 35–38 and apertures 42 are selected in order to provide a flow rate which results in the desired degree of air or oxygen absorption in the water flowing through tube 24.

In operation, water flowing in the direction of flow arrow 13 enters spool housing 10 and is conducted through flow-through tube 24. Air or oxygen is supplied via inlet pipe 22 to the interior of header tank 21, passes through openings 35–38, flows along fluid passages 31–34 and through apertures 42. The air entering the interior of flow-through tube 24 encounters the water flowing therethrough and is dissolved therein. Aerated water then exits from spool housing 10 and flows along water outlet conduit 16 in the direction of flow arrow 14. It is noted that air or oxygen may be either supplied under pressure through inlet pipe 22 to the interior of header tank 21 or may be drawn thereinto by the vacuum produced by the flow of water through flow-through tubes 24 past aperture 42.

Figure 6:
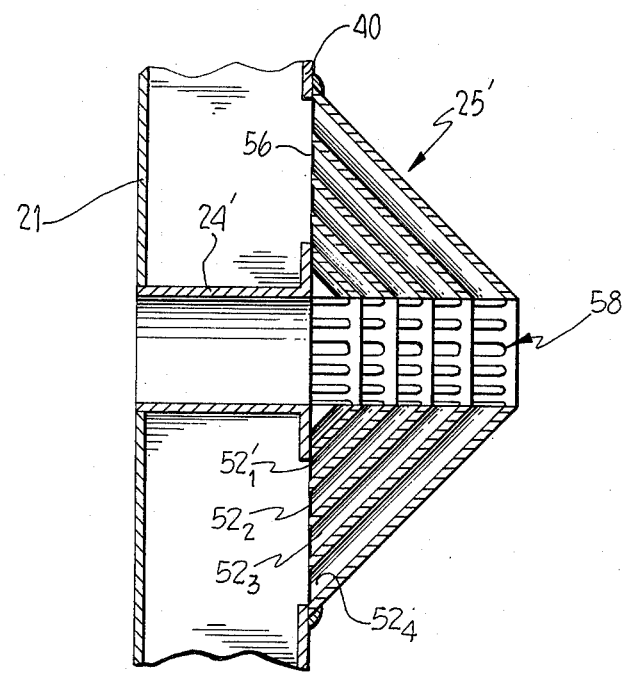
FIG. 6 is a sectional view similar to FIG. 3 showing an alternate platelet assembly.
Figure 8:
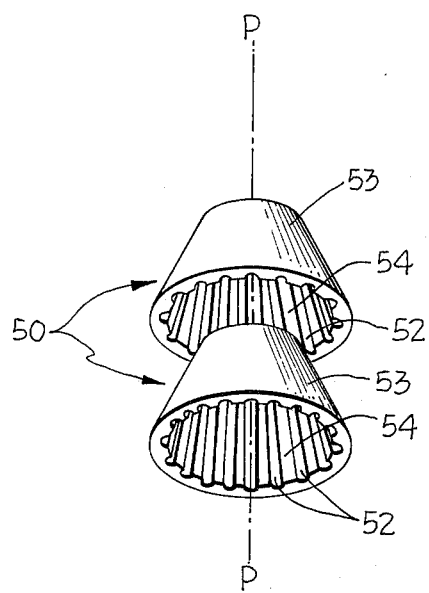
FIG. 8 is a lower perspective view showing a pair of platelets with an alternate construction.
Figure 7:
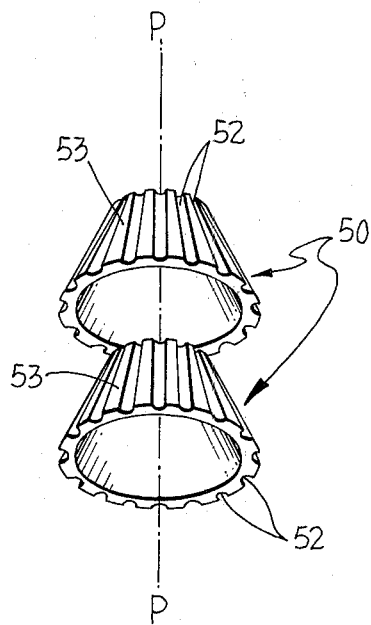
FIG. 7 is an upper perspective view showing a pair of platelets used to construct the platelet assembly of FIG. 6.

FIGS. 6–8 illustrate an alternate embodiment of the invention. As shown in FIG. 6, in this embodiment flow through tubes 24' of tank 21 terminate at downstream wall 40. A stacked integral conical platelet assembly 25' is sealingly adhered to the surface of downstream wall 40 by any suitable means, such as brazing, welding, gluing, soldering, or the like. Platelet assembly 25' comprises a plurality of individual platelets 50, two of which are shown in FIG. 7 prior to stacking. Each platelet 50 has a plurality of channels 52 formed in the outer surface 53 along a line defined by a plane passing through the surface and through the geometrical axis P of the platelet 50. Channels 52 may be formed in surfaces 53 by any convenient means, such as chemical milling, machining, stamping or other equivalent processes known to those skilled in the art. Platelet assembly 25' is fabricated by stacking the individual platelets 50, mutually bonding these elements together by welding, soldering, gluing or the like, and trimming the base end as shown. Channels 52 may be formed on either the outer surface 53 as shown in FIG. 7, on the inner surface 54 as shown in FIG. 8, or on both surfaces, depending on the requirements of a particular application.

In the embodiment shown in FIG. 6, downstream wall 40 of header tank 21 terminates in a circular opening 56. It is understood, however, that downstream wall 40 may be fabricated with openings as shown in FIGS. 4 and 5 or the equivalent when integral platelet assemblies 25' are employed.

The interior region 58 defined by the stacked platelet assembly 25' defines a mixture region downstream of wall 40 of tank 21. In most applications envisioned for the invention, optimum mixing of the primary and secondary fluids in mixture region 58 is obtained if the pressure drop experienced by the secondary fluid in flowing from tank 21 to mixture region 58 is uniform over the several passages formed by channels $52_i$ having different lengths. For this purpose, the individual diameters of the channels $52_i$ are varied.

For example, the diameter of channels $52_2$ are formed larger than the diameter of channels $52_1$, the diameter of channels $52_3$ are formed larger than the diameter of channels $52_2$, etc. The actual dimensions required to provide the desired uniform pressure drop in any given application can readily be determined by those of ordinary skill in the art in an emperical manner.

As will be apparent to those skilled in the art, the FIGS. 6–8 embodiment lends itself to quick and simple attachment to wall 40 and thus may be preferred where ease of installation or economy is a prime concern. In addition, channels 52 can be accurately formed to precise tolerances at relatively low cost using the techniques noted above and thus integral platelet assembly 25' may be preferably employed in applications requiring fluid flow passageways dimensioned to precise specifications. It should further be noted that channels $52_i$ of different platelets 50 may be formed to other relative dimensions, if desired, to provide differential flow rates through different platelet channels 52.

As will now be apparent, the invention provides a simple, rugged and convenient device for injecting a secondary fluid into a primary fluid flowing in a conduit which may be quickly installed and later removed, if desired, with a minimum of labor and expense. In addition to the uses noted above, the invention may be employed for the chlorination of water, for the ozonization of sewage, and in other applications in which the prime requisite is thorough mixing of two fluids. In addition, since the invention utilizes no moving mechanical parts, no additional mechanical power is required to operate devices constructed according to the invention.

While the foregoing provides a full and complete disclosure of the preferred embodiment of the invention, various modifications, alternate constructions and equivalents may be employed without departing from the true spirit and scope of the invention. For example, openings 35–38 in header tank wall 40 may assume other shapes than those specifically illustrated. Therefore, the above description should not be taken as limiting the scope of the invention which is defined by the appended claims.

What is claimed is:

1. A fluid eductor for injecting a secondary fluid into a primary fluid flowing along a path in a conduit, said eductor comprising a tank adapted to be coupled to said conduit in the path of said primary fluid, said tank having means defining a hollow interior, said means including an apertured downstream wall, an inlet pipe in fluid communication with said interior and adapted to be coupled to a source of said secondary fluid, a flow-through conduit extending through said tank and terminating in an apertured portion downstream of said tank, said apertured portion having a plurality of apertures formed therein, and a platelet assembly surrounding said downstream portion of said flow-through conduit, said platelet assembly having a plurality of fluid passageways in communication with said hollow interior via said apertured downstream wall and the interior of said flow-through conduit via said apertures in said apertured portion for enabling said secondary fluid to flow from said tank to the interior of said flow-through conduit and intermingle with said primary fluid downstream of said wall.

2. The combination of claim 1 including a plurality of flow-through conduits and a corresponding plurality of platelet assemblies each associated to a different one of said flow-through conduits.

3. The combination of claim 1 wherein said apertures in said downstream portion of said flow through conduit are arranged in a plurality of rows of circumferentially arranged apertures, said rows being spaced along the length of said flow-through conduit, each one of said rows being arranged in fluid communication with a different one of said plurality of fluid passageways.

4. The combination of claim 1 wherein said platelet assembly comprises a plurality of concentrically arranged frusto-conical plates mutually spaced to provide said fluid passageways.

5. The combination of claim 1 wherein said plurality of apertures in said wall are arranged in a plurality of concentric circular rows of spaced apertures, each said row being in fluid communication with a different one of said fluid passageways, said rows being arranged substantially concentric to said flow through conduit.

6. The combination of claim 1 wherein said plurality of apertures in said wall are arranged in a plurality of pairs of circular segmental apertures concentrically arranged, each said pair being in fluid communication with a different one of said passageways.

7. The combination of claim 1 further including a housing adapted to be secured to said conduit in the flow path of said primary fluid, said tank being secured to said housing.

8. The apparatus of claim 7 wherein said housing is spool shaped.

9. The combination of claim 7 further including an outlet conduit coupled to the downstream end of said housing.

10. A fluid eductor for injecting a secondary fluid into a primary fluid flowing along a path in a conduit, said eductor comprising a tank adapted to be coupled to said conduit in the path of said primary fluid, said tank having means defining a hollow interior, said means including an apertured downstream wall, an inlet pipe in fluid communication with said interior and adapted to be coupled to a source of said secondary fluid, a flow-through conduit extending through said tank and having an outlet adjacent said apertured downstream wall, and a platelet assembly having a hollow interior defining a mixture region with a primary fluid inlet adjacent said flow-through conduit outlet, said platelet assembly having a plurality of fluid passageways in communication with said hollow interior via said apertured downstream wall and in communication with said mixture region for enabling said secondary fluid to flow from said tank to said mixture region and intermingle with said primary fluid downstream of said wall.

11. The combination of claim 10 including a plurality of flow-through conduits and a corresponding plurality of platelet assemblies each associated to a different one of said flow through conduits.

12. The combination of claim 10 wherein said platelet assembly comprises a plurality of concentrically arranged frusto-conical plates having a base end and a apex end and channels formed on at least one surface thereof extending from said base to said apex end, adjacent ones of said plates being arranged in surface contact to seal said channels to form said plurality of fluid passageways.

13. The combination of claim 12 wherein the channels on different ones of said plates are formed to different transverse dimensions in order to provide a substantially uniform pressure drop between said tank and said mixture region for said secondary fluid.

14. The combination of claim 12 wherein said channels extend along a line formed by the intersection of a plane passing through said surface and containing the geometrical axis of said plate.

15. The combination of claim 12 wherein said channels are all formed on the outer surfaces of said frusto-conical plates.

16. The combination of claim 12 wherein said channels are all formed on the inner surfaces of said frusto-conical plates.

17. The combination of claim 10 further including a housing adapted to be secured to said conduit in the flow path of said primary fluid, said tank being secured to said housing.

18. The combination of claim 17 further including an outlet conduit coupled to the downstream end of said housing.

* * * * *